Figure 1:
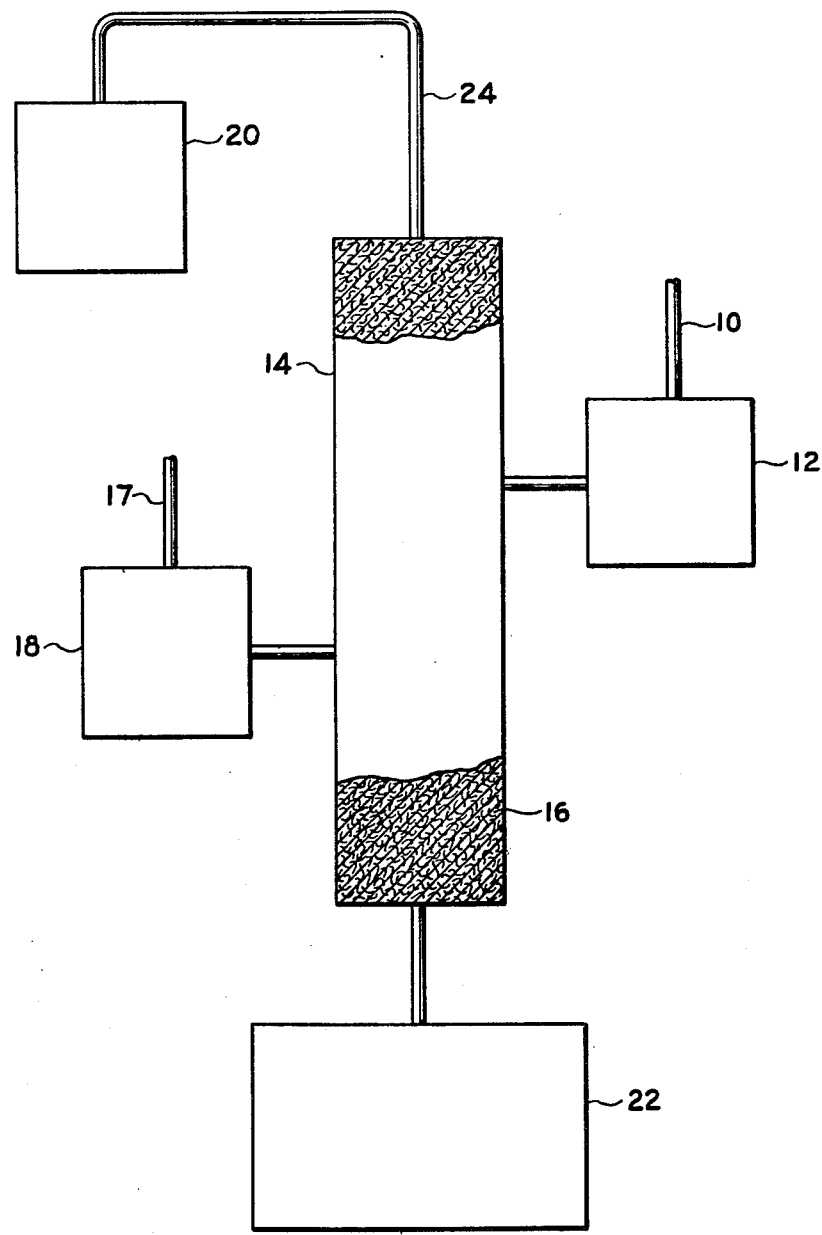

Feb. 10, 1970  I. HECHENBLEIKNER  3,494,986
PROCESS FOR THE PREPARATION OF TRIESTERS OF PHOSPHORUS
Filed July 1, 1963  2 Sheets-Sheet 1

Feb. 10, 1970  I. HECHENBLEIKNER  3,494,986
PROCESS FOR THE PREPARATION OF TRIESTERS OF PHOSPHORUS
Filed July 1, 1963  2 Sheets-Sheet 2

3,494,986
PROCESS FOR THE PREPARATION OF TRIESTERS OF PHOSPHORUS
Ingenuin Hechenbleikner, Cincinnati, Ohio, assignor to Hooker Chemical Corporation, Niagara Falls, N.Y., a corporation of New York
Filed July 1, 1963, Ser. No. 291,962
Int. Cl. C07f 9/08
U.S. Cl. 260—974         6 Claims This invention relates to the preparation of phosphorus compounds. More particularly, it relates to the preparation of triesters of phosphorus.

A number of methods of preparing trialkyl phosphates and phosphites have been previously proposed. The principal problem in some of these methods of preparing triesters of phosphorus has been the isolation of the desired product in a relatively pure state before undesirable side reactions take place. The removal of hydrogen chloride and excess alcohol is utilized in some instances to solve this problem.

Among the methods previously proposed to remove hydrogen chloride have been the uses of ammonia, vacuum stripping, film evaporation and so forth. These methods have certain inherent disadvantages, however, in that none is entirely satisfactory. Ammonia addition, for instance, requires close process control to avoid formation of phosphoramidates and attendant lower yields. Vacuum stripping to completely remove the HCl is time consuming and requires refrigerated condensers to avoid excessive losses of excess alcohol which is carried out by the evolving gases. Film evaporation requires expensive specialized equipment.

It has been found that these prior difficulties may be overcome, and a good yield of high quality ester of phosphorus may be produced by means of the process of the present invention. In accordance with this invention esters of phosphorus are prepared continuously by passing a phosphorus-containing compound selected from compounds having the following structural formulae:

and

wherein X is a halogen selected from the group consisting of chlorine and bromine, Y and Z, which can be the same or different, are selected from the group consisting of halogen, R and OR groups, wherein R is a hydrocarbon radical, such as alkyl, alkoxyalkyl, cycloalkyl, alkaryl, aryl and aralkyl having from 1 to 12 carbon atoms in the radical, and A is selected from the group consisting of oxygen and sulfur through a column containing packing material, passing an alcohol in countercurrent flow through said column, maintaining temperature and pressure conducive to the reaction between said phosphorus-containing compound and said alcohol in said column, and thereafter obtaining an ester of phosphorus at the base of said column.

It has been discovered that when the vapors of a phosphorus-containing compound and an alcohol are comingled in a reaction column for a sufficient period of time to allow the desired reaction to take place, the triester of phosphorus is formed and decends down the column to be recovered at the bottom of the reaction column.

Illustrative of the phosphorus-containing compounds which may be utilized in the practice of this invention are phosphorus trichloride, phosphorus oxychloride, thiophosphoryl chloride, phenylphosphorus dichloride, phenyl phosphorus dibromide, phenyl phosphoric dichloride, phenyl phosphonothioic dichloride, phenyl phosphorodichloridate, diphenyl phosphinous chloride, diphenyl phosphorochloridate, diphenyl phosphorochlorodite, diphenyl phosphonic chloride and so forth.

Mono and dihydroxyl alcohols may be utilized in the practice of this invention. Suitable alcohols are methanol, ethanol, propanol, n-octadecanol, cyclohexanol, cyclopentanol, beta-naphthanol, benzylalcohol, alpha-phenylethanol, cetyl alcohol, ethylene glycol, propylene glycol, m- and p-cresols, and so forth.

Referring to FIGURE 1, the invention may be described as follows:

An excess of alcohol is fed through conduit 10 to vessel 12 where it is vaporized and passed into column 14 which is packed with packing material 16 to provide an efficient contact surface for the reactants. The phosphorus-containing compound is passed through line 17 into vessel 18, where it is vaporized and the vapors are passed into column 14. The excess alcohol and HCl byproduct formed, under the conditions of temperature and pressure at which this process is carried out are conveyed to container 20 by line 24. The product of the reaction usually being in the liquid state and heavier than the vapor being passed into the column, descends through the column 14 and is collected in receiving vessel 22. It is then subjected to distillation to recover the desired product.

Figure 2:
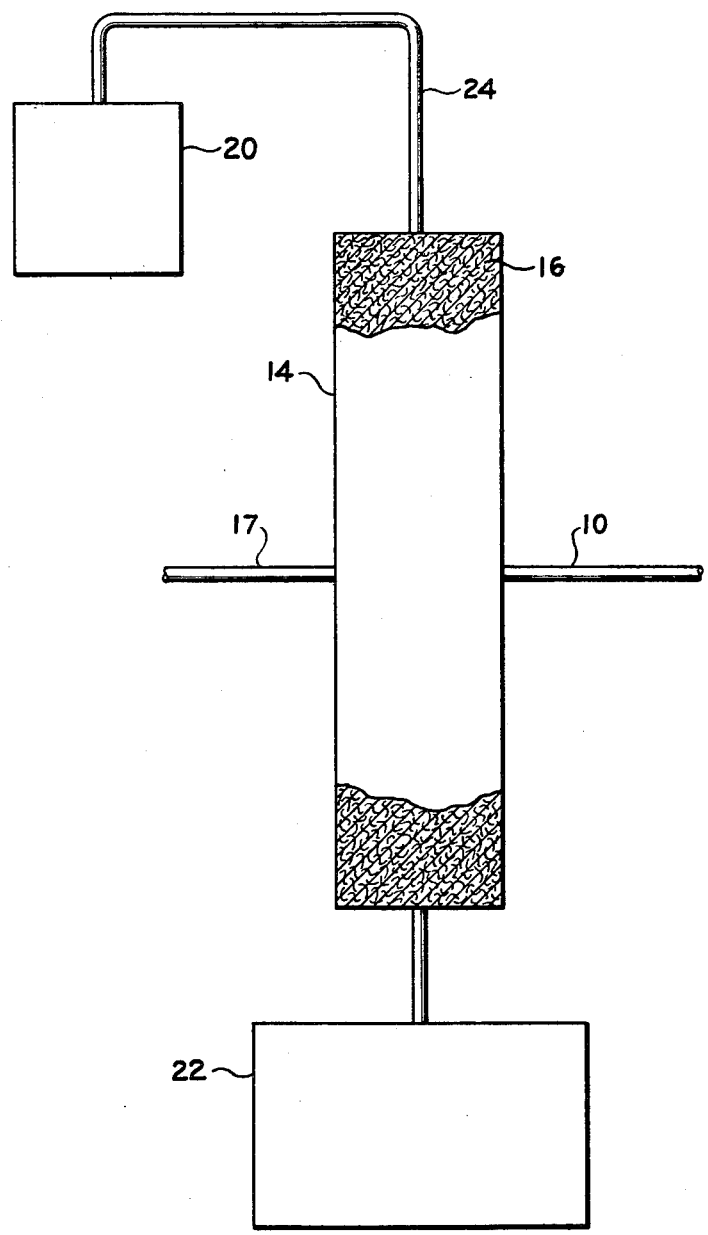

In FIGURE 2, wherein the numerals refer to the same components as set forth in FIGURE 1, the alcohol and phosphorus containing compound vaporizers 12 and 18, respectively, are deleted and both reactants are fed directly into the column 14 at adjacent points. Under the conditions of temperature and pressure maintained in the column the reactants may be entirely or partially vaporized, the vapors of the alcohol and phosphorus containing compound rising concurrently to a point where they form a liquid ester of phosphorus which then passes downwardly through the column 14 to the receiving vessel 22. The desired ester of phosphorus, e.g., mono-, di-, or triester of phosphorus, is obtainable by removing the product from the column at the appropriate level. As the ester flows downwardly through the vaporized reactants it is converted to the di- and finally to the triester. Thus, if the diester is desired the point of highest concentration of the diester may be ascertained and its removal by known means may be effected there.

The reactants may be passed into column 14 at about the same level as illustrated in FIGURE 2, or the alcohol is introduced into column 14 at a point above the point at which the phosphorus containing compound is introduced, as illustrated in FIGURE 1. In either process the vaporized reactants form a liquid product, e.g., a phosphorus monoester, which then passes downwardly through the column and is converted to the di-, and triesters of phosphorus as the alcohol vapors move upwardly. In a preferred embodiment of this invention phosphorus oxychloride and butanol are passed into column 14 at about the same level and a good yield of high quality tributyl phosphate is recovered, as illustrated by the examples hereafter set forth. The temperature of the column may be maintained at from 25 to 200 degrees centigrade. It is preferred that the column 14 be at such temperature and pressure to allow for the formation of the desired phosphorus ester and to permit the efficient removal of HCl and excess alcohol. Therefore, temperatures of from 25 to 150 degrees centigrade, at pressures of from about 5 to about 760 mm. of mercury are suitable. It is preferred, however, to maintain the temperature between about 25 and 40 degrees centigrade, utilizing pressures of from between about 5 and 400 mm. of mercury. The vaporizing vessels 12 and 18 may be maintained at a temperature sufficient to cause the reactants to vaporize. Thus, alcohol vaporizer 12 should be maintained at a temperature of about at least 65 degrees centigrade. It is preferred to have vaporizer vessel 12 at a temperature between about 155 and 195 degrees centigrade with temperatures of from about 65 to 200 degrees centigrade also being within the scope of this invention. The vaporizer vessel 18 for the phosphorus-containing vessel should also be kept under suitable conditions of temperature and pressure to allow the phosphorus-containing reactant to be vaporized. Thus, temperatures between about 60 and 200 degrees centigrade may be utilized, with temperatures between about 145 and 185 degrees centigrade being preferred.

Column 14 may be packed with material inert to the reactants, such as, glass helices, Raschig rings, stainless steel turnings, ceramic chips and the like.

The following examples illustrate the invention, but are not to be interpreted as limiting it in any respect. All parts are by weight and temperatures are in degrees centigrade, unless otherwise stated.

EXAMPLE 1

Utilizing a reaction system similar to FIGURE 1, without packing, vapors of excess butanol were reacted with the vapors of phosphorus oxychloride (153 parts) by dropping the reactants into the vaporizing vessels so that flash vaporization occurred. The column was maintained at about 25 degrees centigrade under 100 mm. Hg pressure. Tributyl phosphate was recovered at the bottom of the column in a 40 percent yield.

EXAMPLE 2

Example 1 was repeated, however, the vapors of the reactants were passed into the column at adjacent points by flash vaporization. The phosphorus containing vaporizer 18 was maintained at a temperature of about 165 degrees centigrade and the alcohol vaporizer 12 was maintained at a temperature of about 175 degrees centigrade. The rate of flow of phosphorus oxychloride to butanol was about 1:7 and a substantially instantaneous reaction in the column was effected. The reaction was completed over a two hour period. Tributyl phosphate was recovered in about a 23 percent yield.

EXAMPLE 3

Example 2 was repeated utilizing a pressure of about 100 mm. Hg in the column. Phosphorus oxychloride (39.5 milliliters) and butananol (500 milliliters) were reacted over a period of one and a half hours. Tributyl phosphate (115 parts) was recovered in a yield of about 69.5 percent.

EXAMPLE 4

Example 3 was repeated except that the column was filled with helical packing. Phosphorus oxychloride (65.5 milliliters) and butanol (500 milliliters) were passed into the column 4 over a period of one and a half hours. 93 parts of the product was recovered by distillation, which amounts to a yield of 49 percent based on the phosphorus oxychloride employed.

EXAMPLE 5

Utilizing a system similar to FIGURE 2, butanol (500 milliliters) and phosphorus oxychloride (0.968 mole) were passed into the column over a period of three hours. The column was maintained at about 25 degrees centigrade at a pressure of 100 mm. Hg. 180 grams of tributyl phosphate were recovered, amounting to a yield of about 70 percent.

EXAMPLE 6

Example 5 was repeated maintaining the column at a temperature from between about 50 and 54 degrees centigrade and a pressure of 50 mm. Hg phosphorus oxychloride (153 parts) was reacted with butanol (450 milliliters) over a period of four hours. 139 parts of tributyl phosphate were recovered, amounting to a yield of 52.2 percent. This example and Examples 1–5 illustrate that the effective reaction time for this process is between about one-half and three minutes.

It will be recognized that various modifications within this invention are possible, some of which have been referred to above.

What is claimed is:

1. A continuous process for the preparation of esters of phosphorus which comprises passing a phosphorus-containing compound selected from compounds having the following structural formulae:

and

wherein X is a halogen selected from the group consisting of chlorine and bromine; Y and Z are selected from the group consisting of halogen, a hydrocarbon radical and —OR, wherein R is a hydrocarbon radical; and A is selected from the group consisting of oxygen and sulfur downwardly through a column containing packing material, passing vapor of an alcohol upwardly through said column, maintaining temperature and pressure conducive to the reaction between said phosphorus-containing compound and said alcohol in said column, and thereafter obtaining an ester of phosphorus adjacent the base of said column.

2. A process for the preparation of esters of phosphorus which comprises passing a phosphorus-containing compound selected from compounds having the following structural formulae:

and

wherein X is a halogen selected from the group consisting of chlorine and bromine; Y and Z are selected from the group consisting of halogen, a hydrocarbon radical and —OR, wherein R is a hydrocarbon radical; and A is selected from the group consisting of oxygen and sulfur downwardly through a column containing packing material, passing vapor of an alcohol upwardly through said column, maintaining a temperature of about 50 degrees to about 150 degrees centigrade and a pressure of about 5 to about 760 mm. of mercury in said column, and thereafter obtaining an ester of phosphorus adjacent the base of said column.

3. A continuous process for the preparation of esters of phosphorus which comprises passing a phosphorus containing compound selected from the compounds having the following structural formulae:

and

wherein X is a halogen selected from the group consisting of chlorine and bromine; Y and Z are selected from the group consisting of halogen, a hydrocarbon radical and —OR, wherein R is a hydrocarbon radical; and A is selected from the group consisting of oxygen and sulfur downwardly through a column containing packing material, passing vapor of an alcohol upwardly through said column, maintaining a temperature of about 50 degrees to about 150 degrees centigrade and a pressure of about 5 to about 760 mm. of mercury in said column and a total contact time between said reactants of about one-half to about 3 minutes, and thereafter obtaining an ester of phosphorus adjacent the base of said column.

4. A continuous process for preparing tributyl phosphate which comprises passing phosphorus oxychloride and butanol through a column containing packing material, maintaining temperature and pressure conducive to the reaction between said compounds in said column and thereafter obtaining tributyl phosphate at the base of said column.

5. A continuous process for preparing tributyl phosphate in accordance with claim 4 wherein the column is maintained at a temperature of from between about 25 and 40 degrees centigrade.

6. A continuous process for preparing tributyl phosphate in accordance with claim 4 wherein butanol is passed downwardly through phosphorus oxychloride.

References Cited

UNITED STATES PATENTS 1,141,266  6/1915  Raschig _____ 23—283
3,035,081  5/1962  Webster _____ 260—973

CHARLES B. PARKER, Primary Examiner

R. L. RAYMOND, Assistant Examiner

U.S. Cl. X.R.

260—973, 976